United States Patent [19]

Bell et al.

[11] Patent Number: 5,554,702
[45] Date of Patent: Sep. 10, 1996

[54] COATED POLYCARBONATE AND METHOD FOR MAKING THE SAME

[75] Inventors: James P. Bell, Storrs, Conn.; Ying Huang; Yunchao Yu, both of Beijing, China

[73] Assignee: The University of Connecticut, Storrs, Conn.

[21] Appl. No.: 351,765

[22] Filed: Dec. 8, 1994

[51] Int. Cl.$^6$ ..................................................... C08G 64/14
[52] U.S. Cl. ............................. 525/463; 525/464; 428/412
[58] Field of Search ................................... 525/463, 464; 524/114; 428/412

[56] References Cited

U.S. PATENT DOCUMENTS

| | | |
|---|---|---|
| 3,098,056 | 7/1963 | Schnell et al. . |
| 3,220,974 | 11/1965 | Fox . |
| 3,258,356 | 6/1966 | Caldwell et al. . |
| 3,261,808 | 7/1966 | Schnell et al. . |
| 3,451,838 | 6/1969 | Burzynski et al. . |
| 3,707,397 | 12/1972 | Gagnon . |
| 4,022,855 | 5/1977 | Hamblen ................................. 264/22 |
| 4,207,357 | 6/1980 | Goossens ................................ 427/162 |
| 4,210,699 | 7/1980 | Schroeter et al. ....................... 428/331 |
| 4,393,158 | 7/1983 | Miller ...................................... 525/464 |
| 4,747,725 | 5/1988 | Gebelius .................................. 40/608 |
| 4,812,363 | 3/1989 | Bell et al. ............................... 428/420 |
| 4,943,619 | 7/1990 | Bell et al. ............................... 525/463 |
| 5,021,266 | 6/1991 | Yamaya et al. ......................... 427/379 |
| 5,021,268 | 6/1991 | Khanarian et al. ..................... 118/402 |
| 5,025,049 | 6/1991 | Takarada et al. ....................... 524/91 |
| 5,041,313 | 8/1991 | Patel ....................................... 427/379 |

FOREIGN PATENT DOCUMENTS

| | | | |
|---|---|---|---|
| 256859 | 11/1987 | Japan | ..................................... 525/433 |
| 1-149878 | 6/1989 | Japan . | |
| 3-6282 | 1/1991 | Japan . | |

*Primary Examiner*—David Buttner
*Attorney, Agent, or Firm*—Fishman, Dionne & Cantor

[57] ABSTRACT

A polymeric coupling agent for chemically linking a scratch resistant coating composition to a polycarbonate substrate is disclosed. The agent is a product of the reaction between polycarbonate and 3-glycidoxypropyltrimethoxysilane (GPS) in the presence of a quaternary ammonium salt. The reaction in the solid state produces a GPS-modified polycarbonate having a bimodal molecular weight distribution which is effective in promoting the adhesion of a scratch resistant coating to a polycarbonate substrate.

16 Claims, No Drawings

COATED POLYCARBONATE AND METHOD FOR MAKING THE SAME

BACKGROUND OF THE INVENTION

1. Field of the Invention

The invention relates generally to polymeric coupling agents and a method for making the same. More particularly, this invention relates to a polycarbonate-silane polymer made from a reaction between polycarbonate and 3-glycidoxypropyltrimethoxysilane (GPS) in the presence of a catalyst, preferably a quaternary ammonium salt.

2. Prior Art

Polycarbonates are well known engineering thermoplastics having high performance characteristics. Polycarbonates are tough, rigid, dimensionally stable and have outstanding impact strength. It will be appreciated that polycarbonate polymers are widely used as glazing materials because of their clarity and toughness. Unfortunately, such optically clear sheets and other articles of polycarbonate can be rather easily scratched and marred. This problem may be overcome by applying a protective coating over the polycarbonate made from a harder, more mar resistant material such as a siliceous abrasion-resistant coating. It would be particularly advantageous to effect a strong chemical bond between the siliceous coating and the polycabonate substrate.

Major manufacturers have been marketing polycarbonate coated with cured silica-filled polysiloxane compositions which are adhered to the polycarbonate substrate through the use of various primers. Examples of polysiloxanes utilized can be found in U.S. Pat. No. 3,451,838; U.S. Pat. No. 4,022,855 and U.S. Pat. No. 4,207,357, among others. Some of these include primers patented in U.S. Pat. No. 3,707,397, U.S. Pat. No. 4,210,699, JP 01-149,878 and UP 03-6,282. These are all reasonably effective but fail to completely alleviate the problems associated with the debonding of the coating composition from the polycarbonate substrate, particularly where moisture and repeated thermal cycling are environmental factors.

Silane coupling agents have also been investigated but have not proved acceptable, particularly in moist and hot environments. The introduction of normal silane coupling agent of either a solution of functional organoalkoxysilane or its hydrolysate into the interface between the polycarbonate and the coating has not proved successful because of insufficient interactions between the coupling agent and the substrate. The result is that eyeglasses, windows, sport lenses, in-roadway reflectors, etc. often appear to debond over a period of time.

Epoxy has also been used to coat polycarbonate with various epoxide primers. Some examples of these are found in U.S. Pat. Nos. 4,747,725; 3,098,056; 3,220,974; 3,261, 808 and 3,258,356. These similarly have had only measurable success. Therefore, there still is a strong need for a way to coat polycarbonate reliably and which exhibits better durability.

SUMMARY OF THE INVENTION

The above-discussed and other drawbacks and deficiencies of the prior art are overcome or alleviated by the coupling agent of the invention and method for its use to bond a hard coating to a polycarbonate substrate.

In accordance with the present invention, a polymeric coupling agent is produced and utilized to bond a siliceous scratch-resistant coating to a polycarbonate substrate, the coating typically being a polysiloxane resin, heavily filled with nanosized silica and optionally, other colloidal hard minerals. More particularly, the coupling agent is an epoxidized silane reacted with polycarbonate material in the presence of a quaternary ammonium salt. From this reaction, a polymeric polycarbonate backbone is produced which provides strong interaction with both the scratch resistant coating material and the polycarbonate substrate. The strong bonds created compensate for the main deleterious factors in organic/inorganic systems such as that disclosed herein; these main factors being 1) weak bonds; 2) thermal expansion mismatch of substrate and coating; and 3) the hydrophilic nature of the mineral surfaces of the components of the invention. Normally these factors create debonding. However, when bonding is effected in accordance with the present invention, these difficulties are alleviated.

The above-discussed and other features and advantages of the present invention will be appreciated and understood by those skilled in the art from the following detailed description.

DESCRIPTION OF THE PREFERRED EMBODIMENT

In accordance with the present invention, it has been discovered that the reaction of polycarbonate with an epoxidized silane, preferably 3-glycidoxypropyltrimethoxysilane (GPS) in the presence of a quaternary ammonium salt, produced an effective polymeric coupling agent for interfacial bonding of a siliceous scratch-resistant coating to a polycarbonate substrate.

The coupling agent itself includes a functional organoalkoxysilane group bonded to a polycarbonate backbone. This provides a superior ability to bond the subject surfaces since the organoalkoxysilane is readily hydrolyzed and the consequently formed silanols can condense with silane groups in the coating, thereby forming strong siloxane bonds while concurrently providing the polycarbonate chain to interpenetrate the polycarbonate substrate.

The preparation of a GPS-modified polycarbonate coupling agent (PC-GPS) includes dissolving a predetermined quantity of polycarbonate, a predetermined quantity of a quaternary ammonium salt, and a predetermined quantity of GPS in an appropriate solvent. After thoroughly mixing the above, the solvent is removed and a solid state reaction takes place pursuant to heating of the residual solids in an oven at a predetermined temperature for a predetermined time. It should be noted that the presence of the catalyst is necessary for the transesterification of the epoxide and the carbonate.

It has been found that the following ranges are well suited to produce the coupling agent of the invention:

TABLE 1

| INGREDIENTS (weight parts) | |
|---|---|
| Polycarbonate | 90–75 |
| Quaternary Ammonium salt | 0.2–1.0 |
| GPS | 10–25 |
| Solvent | 300–500 |

Suitable polycarbonates include: Bisphenol A type polycarbonates and suitable quaternary ammonium salts include: tetraethyl ammonium chloride, tetrabutyl ammonium iodide, benzyl trimethyl ammonium chloride.

Appropriate solvents must only be capable of dissolving the solid state components and then be removable.

TABLE 2

| PROCESSING PARAMETERS | |
|---|---|
| Temperature | 15° C.–80° C. |
| Time | 10d–4h |

Once the PC-GPS is formed it is utilized in the preparation of a primer solution. Most preferably, dioxane and 2-propanol are used to bring the solid PC-GPS into solution. The ratio of PC-GPS, dioxane and 2-propanol is as follows:

TABLE 3

| PC-GPS | 2 g |
|---|---|
| Dioxane | 100 g |
| 2-propanol | 20–60 g |

Other acceptable solvents include: methylene chloride/2-propanol, chloroform/ethanol.

The prepared primer/coupling agent is then applied to uncoated polycarbonate substrate material preferably after the polycarbonate is washed with 2-propanol. Primer is applied in an amount of approximately 1.5–8 mg/cm$^2$. The primer is then air dried. Primer may be applied by any conventional means including but not limited to spraying, dipping or spreading with a squeegee device or knife. Primer layer thickness should preferably be in the range of 0.2μ–1.0μ with a most preferable thickness of about 0.5μ.

Once the primer is dry a top coat composition of preferably a polysiloxane or other siliceous scratch-resistant material is applied thereover. The hardness of the top coat is proportional to the amount of silica colloid in the composition. The entire assembly is then heated to between 120° C. and 130° C. for a period of about 2 hours to effect curing of the compositions. The polymeric coupling agent has proved to be equally effective in enhancing the adhesion of coatings in which the ratio of silica to siloxane ranged from 1:2 to 1:1.

The adhesion of the top coating to the polycarbonate substrate when utilizing the coupling agent varies with the ratio of GPS to polycarbonate by weight of the primer coupling agent. Various ratios and results are set forth in table 4 below.

TABLE 4

| code | ratio of GPS to polycarbonate, by wt | adhesion initial | after water immersion* |
|---|---|---|---|
| without primer | | 0/100 | 0/100 |
| PC-10-GPS | 10:100 | 90/100 | 0/100 |
| PC-15-GPS | 15:100 | 100/100 | 30/100 |
| PC-20-GPS | 20:100 | 100/100 | 100/100 |
| PC-25-GPS | 25:100 | 100/100 | 75/100 |
| PC-30-GPS | 30:100 | 100/100 | 0/100 |

*1 h at 80° C.

As is apparent from the Table 4, a ratio of GPS to polycarbonate by weight which is most preferred is 20:100. However, a range of from 15–25:100 is acceptable.

Effective dying times are set forth in table 5:

TABLE 5

| drying conditions | | adhesion | |
|---|---|---|---|
| °C. | min | initial | after water immersion* |
| RT | 15 | 100/100 | 100/100 |
| RT | 30 | 100/100 | 100/100 |
| RT | 60 | 100/100 | 100/100 |
| RT | 120 | 100/100 | 100/100 |
| 50 | 15 | 100/100 | 100/100 |
| 75 | 15 | 100/100 | 100/100 |
| 100 | 15 | 100/100 | 60/100 |

*1 h at 80° C.

The coupling agent and method of making the same, above described, create far superior results for bonding a scratch resistant coating to a polycarbonate substance even in the normally inhospitable environments of moisture and heat.

EXAMPLE

Preparation of GPS-modified polycarbonates (PC-GPS)

10 g of bisphenol A polycarbonate (from Scientific Polymer Products Inc., weight average molecular weight 53 000 by GPC), 0.05 g of tetrabutylammoniumiodide (TBAI) and 1–3 g of 3-glycidoxypropyltrimethoxysilane (GPC, from Aldrich Chemical Co.) were dissolved in methylene chloride and mixed well. The solvent was removed. The reaction was carried out in the solid state by heating the residuals in an oven at 60° for 16–24 h to give GPS-modified polycarbonates, designated as PC-GPS.

Determination of the GPS conversion

The conversion of GPS during the reaction with polycarbonate was calculated from the change of the epoxy value determined by the pyridinium chloride-pyridine method. A PC-GPS sample of 0.3 g was dissolved in 10 ml of pyridinium chloride-pyridine reagent (0.1N). The mixture was boiled for 20 min. The flask was cooled, and then 6 ml of water and 0.1 ml of phenolphthalein indicator solution were added. The excess acid was titrated with standard 0.05 N alcoholic sodium hydroxide solution.

Preparation of primer solutions 2 g of PC-GPS was dissolved in 100 g of dioxane, and then 20 g of 2-propanol was added. The solutions were used as primers, which were applied onto the surface of polycarbonate substrate prior to a top coating.

Preparation of the top coating composition [1]

In a glass flask 13.6 g of methyltrimethoxysilane and 0.34 g of acetic acid were added, and then 22.3 g of Ludox LS (30% colloidal silica from Du Pont Co.) was introduced. The mixture was stirred at room temperate for 2 h to give a clear solution 0.8 g of acetic acid was added for adjusting the pH to 3.94. Finally, 22.8 g of 2-propanol was added. The composition was aged for one week before use.

Coating procedure

Uncoated polycarbonate sheets (from Rohm and Haas Co.) were washed with 2-propanol and dried at 60° C. for 10 min. The primer was applied to the polycarbonate surface, about 4 mg solution per square centimeter in amount. The primer was air dried. Then the top coating composition was applied, about 10 mg per square centimeter. The sheet was put into an oven, the temperature of which was increased from room temperature to 125° C. in 30 min, and kept at 125° C. for 2 h to effect the curing.

Adhesion test

A cross-cut test method was used for the evaluation of the adhesion. In the test six parallel cuts of 1 mm interval were made in each of two directions at right angles, and a peeling test was performed by using standard pressure sensitive adhesive tape. The adhesion was rated according to the number of squares in which the top coating layer remained. To evaluate the durability of the adhesion the specimens samples were immersed in a water bath at 80° C. for 1 h before executing the cross-cut test.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of making a polymeric coupling agent by reacting, in the presence of a catalyst an epoxidized silane and a polycarbonate backbone to chemically bond said epoxidized silane to said polycarbonate to produce a polymeric coupling agent, said catalyst being catalytically effective to promote chemical bonding between said epoxidized silane and said polycarbonate to produce said polymeric coupling agent.

2. The method of claim 1 wherein the epoxidized silane is 3-glycidoxypropyltrimethoxysilane.

3. The method of claim 1 wherein the polycarbonate is bisphenol A-based.

4. The method of claim 1 wherein:
said polycarbonate comprises a bisphenol A polycarbonate, and said epoxidized silane comprises 3-glycidoxypropyltrimethoxysilane (GPS) to produce a GPS-modified polycarbonate polymer coupling agent.

5. A product produced by the method of claim 1.

6. A product produced by the method of claim 4.

7. A polymeric coupling agent comprising:
the reaction product between an epoxidized silane and a polycarbonate.

8. A polymeric coupling agent as claimed in claim 7 wherein the polycarbonate is selected from the group consisting of bisphenol A polycarbonates.

9. A polymeric coupling agent as claimed in claim 7 wherein said polymeric coupling agent produced by the reaction between polycarbonate and epoxidized silane is produced in the presence of a catalyst.

10. A polymeric coupling agent as claimed in claim 9 wherein the catalyst is at least one quaternary ammonium salt.

11. A polymeric coupling agent as claimed in claim 10 wherein the at least one quaternary ammonium salt is at least one of benzyltrimethyammonium chloride and tetrabutyl ammonium iodide.

12. A polymeric coupling agent as claimed in claim 7 wherein the epoxidized silane is 3-glycidoxypropyltrimethoxy silane.

13. A method of making a polymeric coupling agent by reacting, in the presence of at least one quaternary ammonium salt, an epoxidized silane and a polycarbonate backbone to chemically bond said epoxidized silane to said polycarbonate to produce a polymeric coupling agent, said at least one salt being catalytically effective to promote chemical bonding between said epoxidized silane and said polycarbonate to produce said polymeric coupling agent.

14. The method of claim 13 wherein at least one quaternary ammonium salt is selected from the group consisting of benzyltrimethylammonium chloride and tetrabutylammoniumiodide.

15. A product produced by the method of claim 14.

16. A method of making a polymeric coupling agent by reacting, in the presence of a catalyst, an epoxidized silane and a polycarbonate backbone to chemically bond said epoxidized silane to said polycarbonate to produce a polymeric coupling agent, said catalyst being catalytically effective to promote chemical bonding between said epoxidized silane and said polycarbonate in a ratio of about 15 grams to about 25 grams of epoxidized silane for each 100 grams of polycarbonate to produce said polymeric coupling agent.

* * * * *